US008808548B2

(12) United States Patent
Miyabayashi et al.

(10) Patent No.: US 8,808,548 B2
(45) Date of Patent: Aug. 19, 2014

(54) MAGNETIC SEPARATION APPARATUS AND MAGNETIC SEPARATION METHOD, AND WASTEWATER TREATMENT APPARATUS AND WASTEWATER TREATMENT METHOD

(75) Inventors: Satoshi Miyabayashi, Tokyo (JP); Hisashi Isogami, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 413 days.

(21) Appl. No.: 12/963,653

(22) Filed: Dec. 9, 2010

(65) Prior Publication Data
US 2011/0139721 A1 Jun. 16, 2011

(30) Foreign Application Priority Data

Dec. 14, 2009 (JP) ................. 2009-283045

(51) Int. Cl.
B01D 35/06 (2006.01)
B01D 21/08 (2006.01)
B03C 1/00 (2006.01)
B03C 1/30 (2006.01)
C02F 1/24 (2006.01)
C02F 1/48 (2006.01)
C02F 1/52 (2006.01)
C02F 9/00 (2006.01)

(52) U.S. Cl.
CPC ............... B01D 35/06 (2013.01); B01D 21/08 (2013.01); B03C 1/00 (2013.01); B03C 1/30 (2013.01); C02F 1/24 (2013.01); C02F 1/488 (2013.01); C02F 1/52 (2013.01); C02F 9/00 (2013.01)
USPC ........... 210/695; 210/704; 210/784; 210/199; 210/206; 210/208; 210/396; 210/402; 209/219; 209/223.2; 209/229

(58) Field of Classification Search
CPC .......... B01D 21/08; B01D 35/06; B03C 1/00; B03C 1/30; C02F 1/24; C02F 1/48; C02F 1/488; C02F 1/52; C02F 9/00
USPC ......... 210/670, 695, 222, 223, 259, 704, 784, 210/199, 206, 208, 396, 402; 209/219, 209/223.2, 229
See application file for complete search history.

(56) References Cited

U.S. PATENT DOCUMENTS 5,944,986 A 8/1999 Saho et al.

FOREIGN PATENT DOCUMENTS

CA 2 640 019 A1 4/2009
CN 2651237 Y 10/2004
(Continued)

OTHER PUBLICATIONS

Machine Translation of JP 09-0011776, dated Jan. 7, 1997.*
(Continued)

Primary Examiner — David A Reifsnyder
(74) Attorney, Agent, or Firm — Antonelli, Terry, Stout & Kraus, LLP.

(57) ABSTRACT

A magnetic separation apparatus, comprising: a separation tank to which wastewater containing flocculated magnetic flocs is supplied; a disk-shaped or a drum-shaped separator that adsorbs the magnetic flocs with magnetic force while being rotated, the separator being arranged in the separation tank; and a collection device that collects the magnetic flocs adsorbed by the separator, wherein the improvement comprises that a rotational direction of the separator in the wastewater in the separation tank is set to be the same as a flow direction of the wastewater flowing in the separation tank as well as a lower portion of the separator being under the wastewater in the separation tank.

8 Claims, 12 Drawing Sheets

(56) References Cited

FOREIGN PATENT DOCUMENTS

| EP | 1676818 A1 * | 7/2006 |
|----|---|---|
| JP | 09-001176 | 1/1997 |
| JP | 2009-101339 | 5/2009 |
| JP | 2009-112978 | 5/2009 |
| NZ | 200320108007.2 | 10/2004 |
| WO | WO 2009/044719 A1 | 4/2009 |
| WO | WO 2009/060813 A1 | 5/2009 |

OTHER PUBLICATIONS

Machine Translation of JP 2009-112978, dated May 28, 2009.*
Mexican Office Action MX/a/2010/013716 dated Jun. 4, 2012 with English translation.
Communication mailed Apr. 23, 2013 in connection with Japanese Patent Application No. 2009-283045, 3 pages; Japanese Patent Office, Japan.
Letter of Mr. Hu dated Mar. 9, 2012 in English submitted to the Canadian Intellectual Property Office.

* cited by examiner

B-B

---BACKGROUND---

---BACKGROUND---

MAGNETIC SEPARATION APPARATUS AND MAGNETIC SEPARATION METHOD, AND WASTEWATER TREATMENT APPARATUS AND WASTEWATER TREATMENT METHOD

BACKGROUND OF THE INVENTION

1. Field of the Invention

The present invention relates to magnetic separation apparatuses and magnetic separation methods, and wastewater treatment apparatuses and wastewater treatment methods and, in particular, to a magnetic separation apparatus and a magnetic separation method, and a wastewater treatment apparatus and a wastewater treatment method that separate suspended solids, oil, and heavy metals from wastewater containing the suspended solids, the oil, and the heavy metals to thereby obtain treated water.

2. Description of the Related Art

Conventionally, wastewater treatment apparatuses using magnetic separation apparatuses have been known for separating suspended solids, oil, and heavy metals from wastewater containing the suspended solids, the oil, and the heavy metals. In such wastewater treatment apparatus, magnetic powder is added to the wastewater when suspended solids, oil, and heavy metals that are contained in wastewater are flocculation-treated, and flocculation flocs (hereinafter referred to as magnetic flocs) containing the magnetic powder are separated with magnetic force of a magnetic separation apparatus to thereby obtain treated water.

FIG. 10 is a block diagram showing a configuration of a wastewater treatment apparatus 100 disclosed in Japanese Patent Application Laid-Open No. 2009-112978.

In this wastewater treatment apparatus 100, wastewater is mixed with a polymeric flocculant in a slow stirring tank 104 after being mixed with magnetic powder (for example, ferrosoferric oxide) and an inorganic flocculant (for example, ferric chloride or polyaluminum chloride) in a rapid stirring tank 102. Suspended solids, oil, heavy metals, etc. in the wastewater are taken into magnetic flocs generated in the rapid stirring tank 102 and the slow stirring tank 104, and thereby the wastewater is purified. The magnetic flocs are separated by a floc separation apparatus 106 installed at a subsequent stage of the slow stirring tank 104. The floc separation apparatus 106 is composed of a magnetic separation apparatus 108 and a filter 110. Wastewater from which the magnetic flocs have been separated results in treated water. The magnetic flocs that have not been separated by the magnetic separation apparatus 108 are separated and removed by the filter 110 in the subsequent stage, and are again returned to the magnetic separation apparatus 108 to be separated.

However, the wastewater treatment apparatus 100 disclosed in Japanese Patent Application Laid-Open No. 2009-112978 has a problem that although clear treated water can be obtained by the magnetic separation apparatus 108 and the filter 110 installed side by side, continuous reverse cleaning that requires a larger filtration area is needed in order to prevent clogging of the filter 110. Namely, although the wastewater treatment apparatus 100 disclosed in Japanese Patent Application Laid-Open No. 2009-112978 has an advantage that a footprint thereof can be made dramatically smaller by using the magnetic separation apparatus 108 instead of a sedimentation basin, the advantage of the magnetic separation apparatus 108 has been impaired because of the requirement of the large filter 110.

Meanwhile, there will be shown a structure of a disk-shaped magnetic separation apparatus 120 disclosed in Japanese Patent Application Laid-Open No. 2009-101339 in FIGS. 11 and 12. It is to be noted that FIG. 11 is a plan view of the magnetic separation apparatus 120, and FIG. 12 is an elevational view thereof, which are perspective explanatory views of a cross section of a semicircular separation tank 122.

Disks 124 and 126 having magnetic force are arranged at a predetermined interval in this separation tank 122 of the magnetic separation apparatus 120. A shaft 128 is fixed to centers of these disks 124 and 126, and is connected to a motor (not shown). The disks 124 and 126 are rotated in a counterclockwise direction as shown in FIG. 12 through the shaft 128 by this motor. In addition, height positions of the disks 124 and 126 have been set so that lower halves thereof may be under wastewater when it flows into the separation tank 122.

A supply portion 130 of wastewater is provided at a bottom center of the separation tank 122. Consequently, flocculated wastewater flows into in the separation tank 122 as an upward flow from the supply portion 130, and it branches in two directions as the supply portion 130 being a center thereof. Subsequently, while the wastewater flows toward treated water outlets 132 and 134 provided at both sides of a top of the separation tank 122, magnetic flocs in the wastewater adhere to the disks 124 and 126. In addition, the magnetic flocs having adhered to the disks 124 and 126 are scraped by a scraper 136 provided between the disks 124 and 126 at a time of rotation thereof. The scraped magnetic flocs are then scraped by a sludge scraper 138 provided along the scraper 136, and discharged to an outside of the magnetic separation apparatus 120.

In this magnetic separation apparatus 120, there exists a region where a water flow direction in the separation tank 122 and a rotational direction of the disks 124 and 126 become opposite to each other (a left side portion as viewed from the shaft 128 shown in FIG. 12). In this region, since a force of detaching the magnetic flocs having adhered to the disks 124 and 126 acts largely on the magnetic flocs due to a flow of wastewater, quality of treated water may slightly deteriorate. Hence, there has been required a filter at a subsequent stage of the treated water outlet 134 in the magnetic separation apparatus 120 disclosed in Japanese Patent Application Laid-Open No. 2009-101339.

As described above, a large filter is needed at a subsequent stage of a magnetic separation apparatus in order to obtain clear treated water in a conventional wastewater treatment apparatus using magnetic force, and thus there has been a disadvantage of impairing an advantage of the magnetic separation apparatus that allows a smaller footprint of the wastewater treatment apparatus.

The present invention is made in view of such circumstances, and has an object of providing a magnetic separation apparatus and a magnetic separation method, and a wastewater treatment apparatus and a wastewater treatment method that allow to obtain clear treated water only with the magnetic separation apparatus without using a filter.

SUMMARY OF THE INVENTION

In order to achieve the above-described object, the present invention provides a magnetic separation apparatus including: a separation tank to which wastewater containing flocculated magnetic flocs is supplied; a disk-shaped or a drum-shaped separator that adsorbs the magnetic flocs with magnetic force while being rotated, the separator being arranged in the separation tank; and a collection device that collects the magnetic flocs adsorbed by the separator, wherein a rotational direction of the separator in the wastewater in the separation tank is set to be the same as a flow direction of the wastewater flowing in the separation tank as well as a lower portion of the separator being under the wastewater in the separation tank.

In order to achieve the above-described object, the present invention provides a magnetic separation method that flows wastewater containing flocculated magnetic flocs into a separation tank, adsorbs the magnetic flocs with magnetic force of a separator while rotating the disk-shaped or the drum-shaped separator, the separator being arranged in the separation tank, and that collects the magnetic flocs adsorbed by the separator with a collection device, wherein a rotational direction of the separator in the wastewater in the separation tank is set to be the same as a flow direction of the wastewater flowing in the separation tank as well as a lower portion of the separator being under the wastewater in the separation tank.

A cause of a disadvantage of a conventional magnetic separation apparatus lies in that there exists a portion where a flow direction of wastewater and a rotational direction of a separator in a separation tank become opposite to each other.

In order to eliminate this disadvantage, the present invention is configured such that a flow direction of wastewater in a separation tank may be the same as a rotational direction of a rotatory disk-shaped or drum-shaped separator. As a result of this, an efficiency of collecting magnetic flocs with the separator is substantially improved since a force of detaching the magnetic flocs having adhered to the separator is substantially reduced. Since the above-described effect makes a conventionally required filter unnecessary, an installation space of the magnetic separation apparatus can be saved. It is to be noted that the separator is not limited to the disk-shaped or the drum-shaped, but any type of separator may be used as long as a circumferential trajectory thereof forms a circle when rotated.

In addition, the magnetic separation apparatus according to the present invention is preferably configured such that a cross section of the separation tank is semicircular, a supply portion of the wastewater is provided at one end of both top ends of the separation tank, the end being located upstream in the rotational direction of the separator, and that an outlet portion of treated water is provided at the other end of the both top ends, the end being located downstream in the rotational direction of the separator.

In addition, the magnetic separation method according to the present invention is preferably configured such that a cross section of the separation tank is formed to be semicircular, the wastewater is supplied to the separator from one end of both top ends of the separation tank, the end being located upstream in the rotational direction of the separator, and that treated water is discharged from the other end of the both top ends, the end being located downstream in the rotational direction of the separator.

The present invention shows one embodiment of magnetic separation apparatuses and magnetic separation methods. Namely, a cross section of a separation tank is formed to be semicircular, wastewater is supplied to a separator from one end of both top ends of this separation tank, the end being located upstream in a rotational direction of the separator, and treated water is discharged from the other end of the both top ends, the end being located downstream in the rotational direction of the separator. As a result of this, a flow direction of the wastewater in the separation tank and the rotational direction of the rotatory separator can be made to be the same as each other employing a simple structure.

In addition, in the magnetic separation apparatus according to the present invention, a maximum circumferential velocity of the separator has preferably been set to be not more than a flow velocity of wastewater in the separation tank.

In addition, in the magnetic separation method according to the present invention, the maximum circumferential velocity of the separator is preferably set to be not more than the flow velocity of wastewater in the separation tank.

Since the magnetic flocs adsorbed by the separator are affected largely by the gravity when coming up from and leaving a surface of the wastewater by a rotation of the separator, they tend to leave the separator. Consequently, when the maximum circumferential velocity of the separator is set to be not more than the flow velocity of the wastewater in the separation tank, a force is added to the magnetic flocs that pushes the magnetic flocs upwardly along with the separator with flow momentum of the wastewater when the magnetic flocs tend to leave the water. As a result of this, since detachment of the magnetic flocs from the separator can be suppressed, an efficiency of collecting the magnetic flocs is further improved.

In order to achieve the above-described object, the present invention provides a wastewater treatment apparatus including: a raw water tank in which wastewater is stored; a rapid stirring tank for mixing wastewater supplied from the raw water tank, magnetic powder, and an inorganic flocculant; a slow stirring tank for generating magnetic flocs in wastewater by mixing the supplied wastewater mixed in the rapid stirring tank and a polymeric flocculant; and a magnetic separation apparatus according to the present invention that separates from wastewater the magnetic flocs in the supplied wastewater mixed in the slow stirring tank.

In order to achieve the above-described object, the present invention provides a wastewater treatment method including the steps of: supplying wastewater stored in a raw water tank to a rapid stirring tank; mixing the wastewater, magnetic powder, and an inorganic flocculant in the rapid stirring tank to then supply the mixed wastewater to a slow stirring tank; stirring the wastewater supplied into the slow stirring tank and a polymeric flocculant to generate magnetic flocs in the wastewater, and then supplying the wastewater to a magnetic separation apparatus; and separating the magnetic flocs from the wastewater supplied to the magnetic separation apparatus with a magnetic separation method according to the present invention.

As explained above, according to the magnetic separation apparatus and the magnetic separation method of the present invention, and the wastewater treatment apparatus and the wastewater treatment method of the present invention, clear treated water can be obtained only with the magnetic separation apparatus without using a filter. As a result of this, footprints of a magnetic separation apparatus and a wastewater treatment apparatus can be reduced, and particularly, the present invention becomes suitable for wastewater treatment equipment that is installed in a structure on the ocean whose installation space is limited.

DETAILED DESCRIPTION OF THE PREFERRED EMBODIMENTS

Hereinafter will be described preferred embodiments of a magnetic separation apparatus and a magnetic separation method, and a wastewater treatment apparatus and a wastewater treatment method according to the present invention with reference to accompanying drawings.

Figure 1:
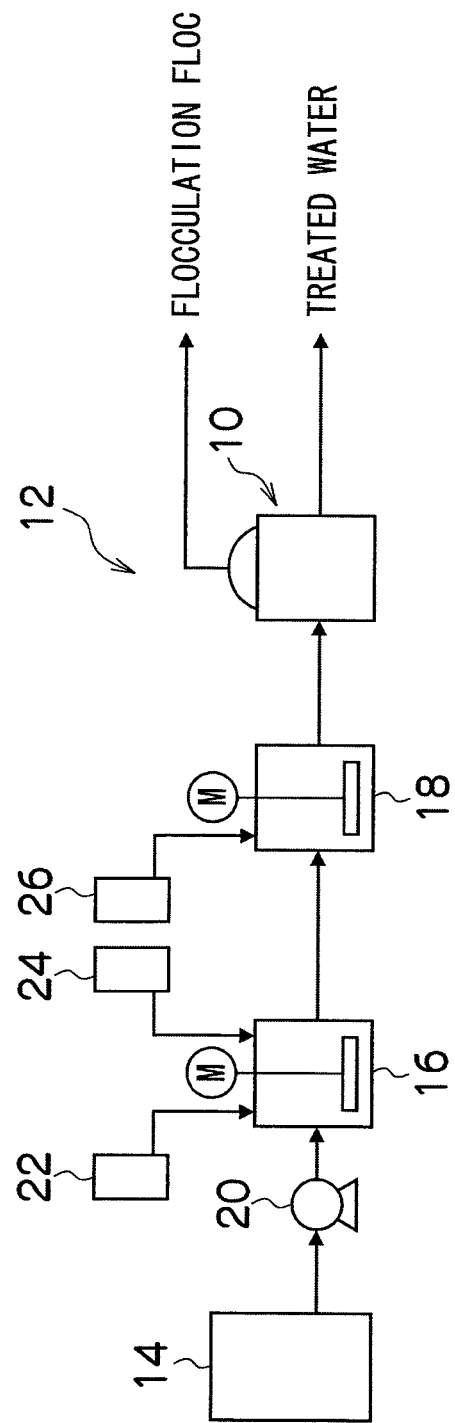
FIG. 1 is a block diagram showing a structure of a wastewater treatment apparatus 12 to which a magnetic separation apparatus of an embodiment is applied.

FIG. 1 is a block diagram showing a structure of a wastewater treatment apparatus 12 to which a magnetic separation apparatus 10 of an embodiment is applied.

This wastewater treatment apparatus 12 is configured such that a raw water tank 14, a rapid stirring tank 16, a slow stirring tank 18, and a magnetic separation apparatus 10 are arranged from upstream to downstream of a wastewater treatment system in that order.

Water to be treated, i.e., wastewater (wastewater containing suspended solids, oil, and heavy metals) is first supplied from the raw water tank 14 to the rapid stirring tank 16 by a raw water pump 20. Next, an inorganic flocculant, for example, PAC (polyaluminum chloride), ferric sulfate, ferric chloride, aluminum sulfate, etc., is added into the rapid stirring tank 16 from an inorganic flocculant tank 22 by an inorganic flocculant injection pump (not shown), and then stirring is performed rapidly. Here, while collision frequency of suspended substances and oil particles rises due to rapid stirring, a large number of small lumps called microflocs are formed by an effect of the flocculant. Subsequently, magnetic powder, such as magnetite, is added into the wastewater from a magnetic powder tank 24 by a magnetic powder injection pump (not shown) inside the rapid stirring tank 16 or just when the wastewater is discharged from the rapid stirring tank 16. The wastewater containing the magnetic powder and the microflocs is then flowed into the slow stirring tank 18 after discharged from the rapid stirring tank 16. Here, a high molecular polymer (polymeric flocculant) is injected into the slow stirring tank 18 from a high molecular polymer tank 26 by a pump (not shown), and the wastewater having the polymer injected therein is stirred in the slow stirring tank 18 at a low speed to thereby grow magnetic flocs. The high molecular polymer in this case is preferable to be anionic one, for example, polyacrylamide is suitable therefor. In a case of using polyacrylamide, it can be considered that polyacrylamide is stored as powder, and that a fixed quantity thereof is injected into the high molecular polymer tank 26 with a feeder to then be stirred. In addition, although an example of using an inorganic flocculant and an anionic high molecular polymer is illustrated above, the following effects can be similarly obtained even when using only a cationic high molecular polymer without using an inorganic flocculant. The water containing the magnetic flocs formed as described above is supplied from the slow stirring tank 18 to the magnetic separation apparatus 10, where it is separated into the magnetic flocs and treated water. The above is a flow of wastewater treatment with the wastewater treatment apparatus 12.

Figure 2:
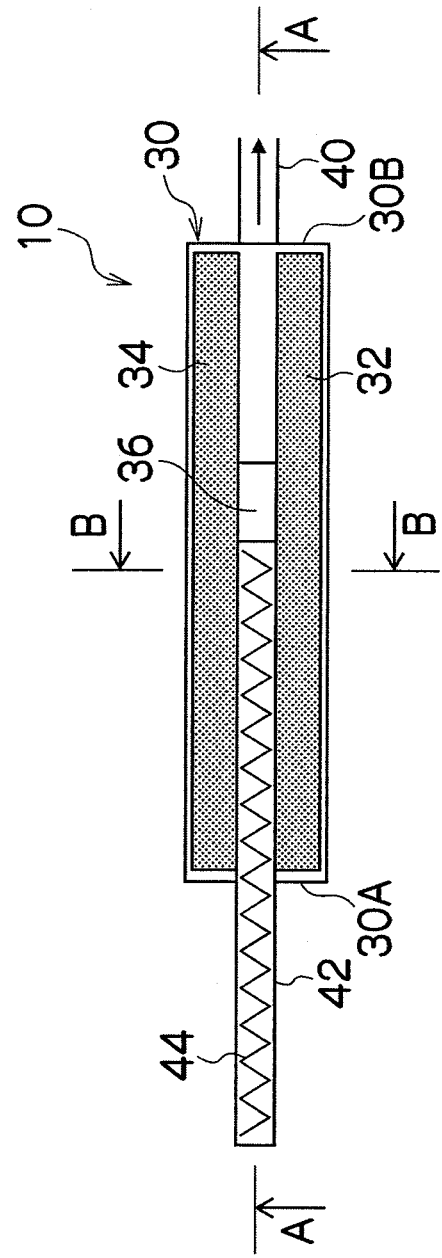
FIG. 2 is a plan view of a magnetic separation apparatus of a first embodiment.
Figure 3:
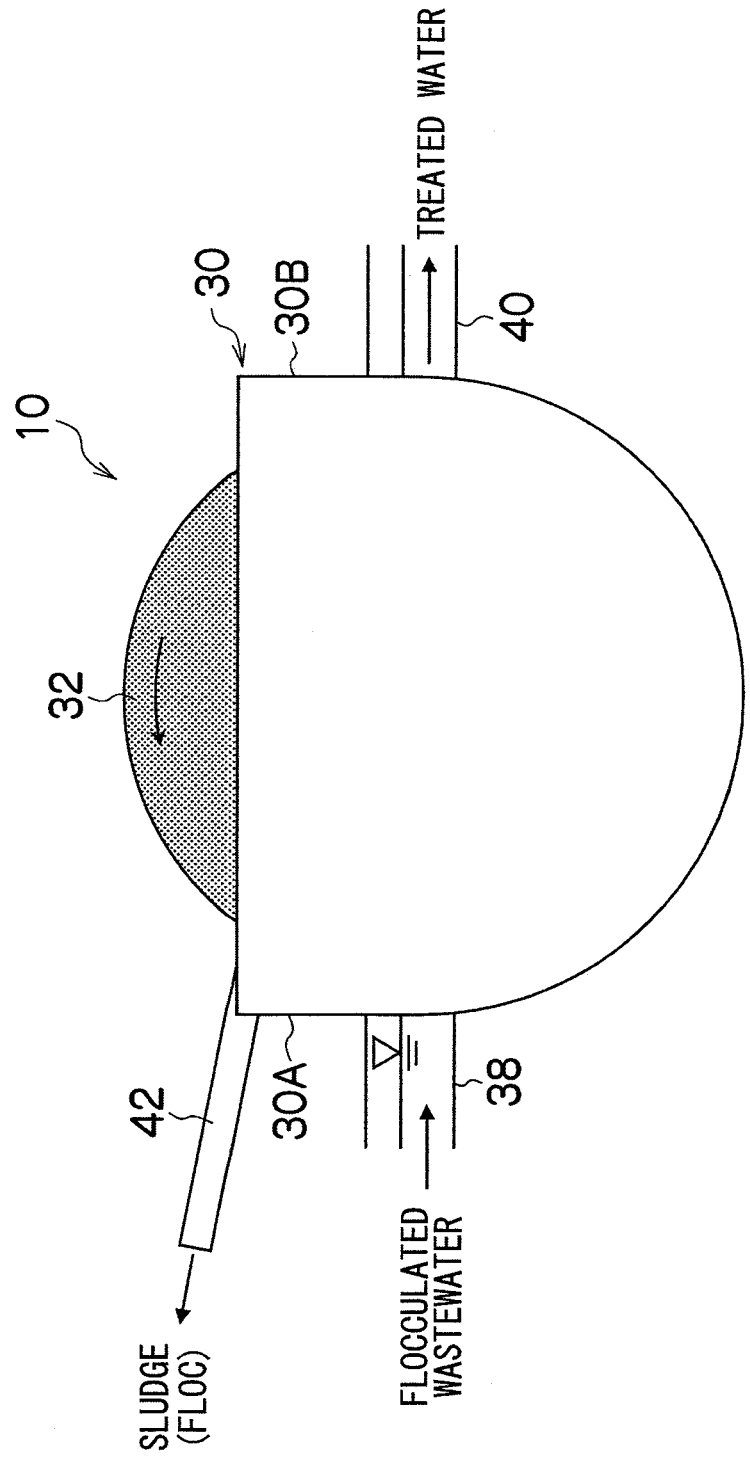
FIG. 3 is an elevational view of the magnetic separation apparatus shown in FIG. 2.
Figure 4:
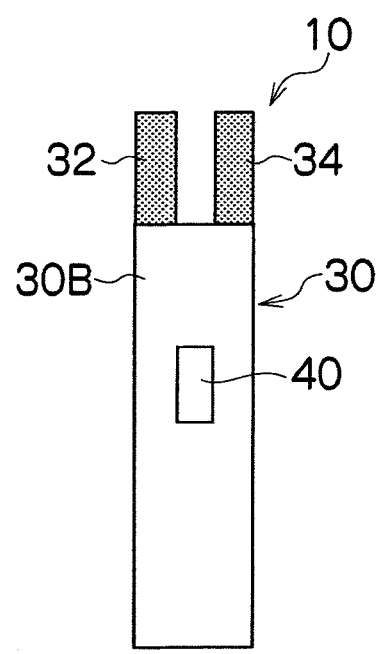
FIG. 4 is a right side view of the magnetic separation apparatus shown in FIG. 3.
Figure 5:
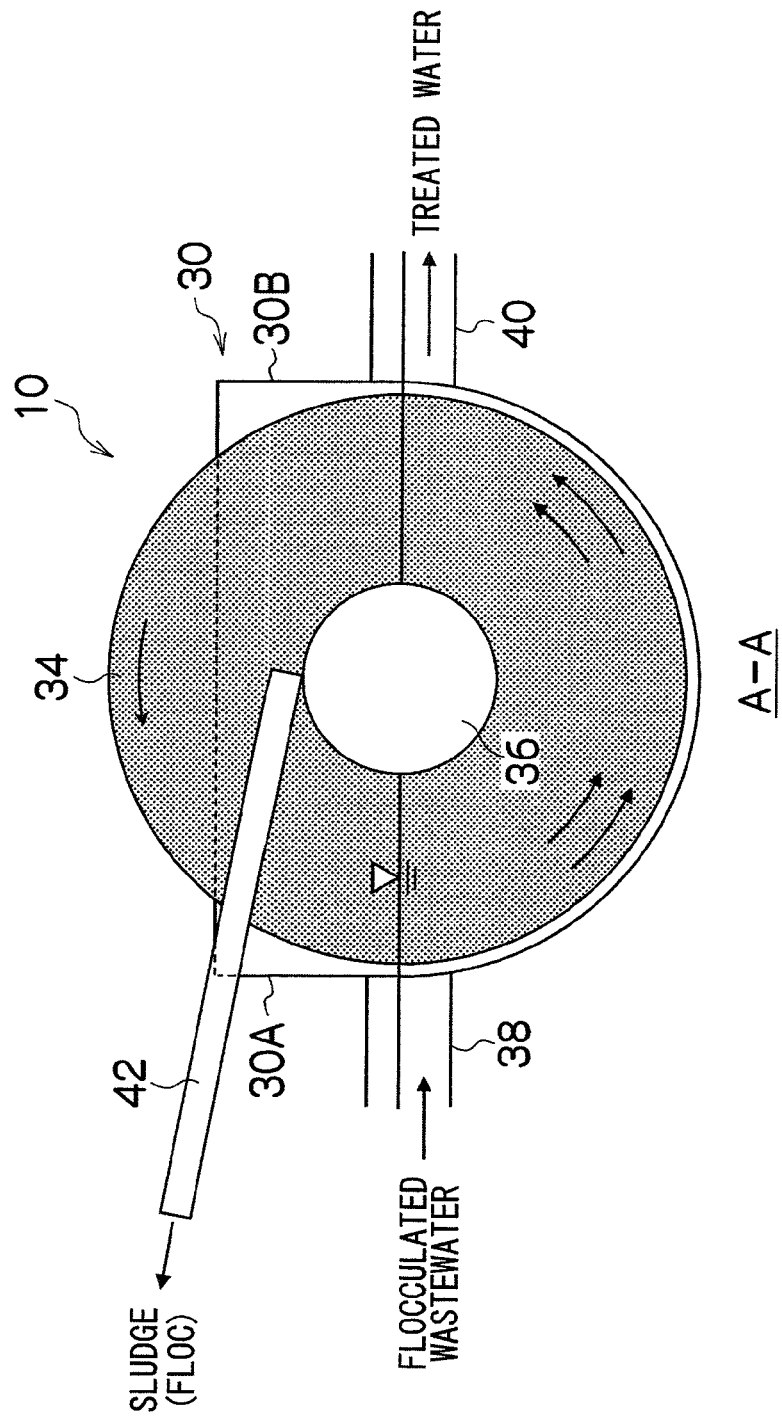
FIG. 5 is a sectional view of the magnetic separation apparatus taken along an A-A line shown in FIG. 2.
Figure 6:
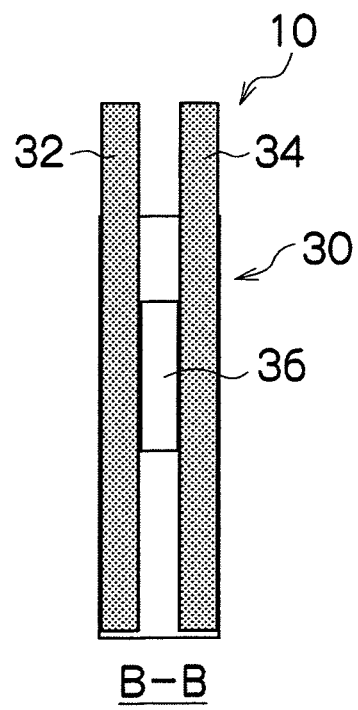
FIG. 6 is a sectional view of the magnetic separation apparatus taken along a B-B line shown in FIG. 2.

The magnetic separation apparatus 10 according to a first embodiment will be shown in FIGS. 2 to 6. Namely, FIG. 2 is a plan view of the magnetic separation apparatus 10, FIG. 3 is an elevational view of the magnetic separation apparatus 10 shown in FIG. 2, FIG. 4 is a right side view of the magnetic separation apparatus 10 shown in FIG. 3, FIG. 5 is a sectional view of the magnetic separation apparatus 10 taken along an A-A line shown in FIG. 2, and FIG. 6 is a sectional view of the magnetic separation apparatus 10 taken along a B-B line shown in FIG. 2.

The magnetic separation apparatus 10 is a disk-shaped magnetic separation apparatus. Namely, in a separation tank 30 of the magnetic separation apparatus 10, at a predetermined interval arranged are two disk-shaped disks 32 and 34 having magnetic force inside which permanent magnets are provided. A shaft 36 is fixed to centers of these disks 32 and 34, it is rotated by a motor (not shown), and thereby the disks 32 and 34 are rotated in a counterclockwise direction shown in FIG. 5. In addition, height positions of the disks 32 and 34 have been set so that lower halves thereof may be under wastewater when it flows into the separation tank 30. It is to be noted that electromagnets may be provided at the disks 32 and 34 instead of permanent magnets. In addition, the number of disks is not limited to two, but three or more may be provided.

The separation tank 30 is a tank whose cross section is formed as a substantially semicircular shape. A supply portion 38 of wastewater is provided on one wall surface 30A of both upper wall surfaces of the separation tank 30, the wall surface 30A being located upstream in a rotational direction of the disks 32 and 34. In addition, an outlet portion 40 of treated water is provided on the other wall surface 30B of the both upper wall surfaces of the separation tank 30, the wall surface 30B being located downstream in the rotational direction of the disks 32 and 34.

The supply portion 38 of the wastewater is a liquid pipeline formed as pipe-shaped, and has been fixed to an opening portion of the one wall surface 30A. In addition, similarly, the outlet portion 40 is also a liquid pipeline formed as pipe-shaped, and has been fixed to an opening portion of the other wall surface 30B. Further, the supply portion 38 and the outlet portion 40 are arranged in a same horizontal surface. Still further, a supply amount of the wastewater in the supply portion 38 and a discharge amount of the treated water in the outlet portion 40 have been balanced with each other so that a surface level at which substantially lower halves of the disks 32 and 34 are under the water may be maintained in the separation tank 30 as shown in FIG. 5.

Consequently, wastewater supplied from the supply portion 38 to the separation tank 30, i.e., wastewater containing flocculation-treated magnetic flocs flows along one path toward the outlet portion 40 without branching, as well as flowing in a same direction as the rotational direction of the disks 32 and 34 in the path. Since the surface level of the wastewater in the separation tank 30 is then maintained to be the level at which the substantially lower halves of the disks 32 and 34 are under the wastewater as described above, there does not exist a portion where a flow direction of the wastewater in the separation tank 30 and the rotational direction of the disks 32 and 34 become opposite to each other.

It is to be noted that the supply portion 38 has been provided on the one wall surface 30A of the separation tank 30, and the outlet portion 40 has been provided on the other wall surfaces 30B due to a shape of the separation tank 30, but not limited to this. Namely, if the cross section of the separation tank 30 is semicircular, the supply portion 38 may be provided at one end of both top ends of the separation tank, the end being located upstream in the rotational direction of the disks 32 and 34, and the outlet portion 40 may be provided at the other end of the both top ends, the end being located downstream in the rotational direction of the disks 32 and 34. In addition, if the rotational direction of the disks 32 and 34 and the flow direction of the wastewater in the separation tank 30 become the same as each other, installation positions of the supply portion 38 and the outlet portion 40 are not limited to the above-described ones. For example, the supply portion 38 and the outlet portion 40 may be provided by displacing them in a height direction from positions on the same horizontal surface.

Meanwhile, as for the wastewater supplied to the separation tank 30, magnetic flocs in the wastewater adhere to the rotating disks 32 and 34 with magnetic force. The magnetic flocs having adhered to the disks 32 and 34 are scraped by a scraper 42 arranged between the disks 32 and 34 at a position of having come up from a water surface at a time of rotation of the disks 32 and 34. Subsequently, the scraped magnetic flocs are scraped by a spiral-shaped sludge scraper 44 provided along the scraper 42 as shown in FIG. 2, and then discharged to an outside of the magnetic separation apparatus 10. The above are functions of the magnetic separation apparatus 10.

Hence, according to the magnetic separation apparatus 10 configured as described above, a force that detaches the magnetic flocs having adhered to the disks 32 and 34 is substantially reduced since the flow direction of the wastewater in the separation tank 30 and the rotational direction of the rotatory disks 32 and 34 are the same as each other, thus substantially improving an efficiency of collecting the magnetic flocs using the disks 32 and 34. Since the above-described effect makes a conventionally required filter unnecessary, an installation space of the magnetic separation apparatus 10 can be saved.

In addition, since the filter is unnecessary also in the wastewater treatment apparatus 12 in which this magnetic separation apparatus 10 has been installed, the installation space of the wastewater treatment apparatus 12 can be saved. Particularly, the present invention is suitable for wastewater treatment equipment that is installed in structures on the ocean, such as offshore platforms, whose installation space is limited.

Figure 7:
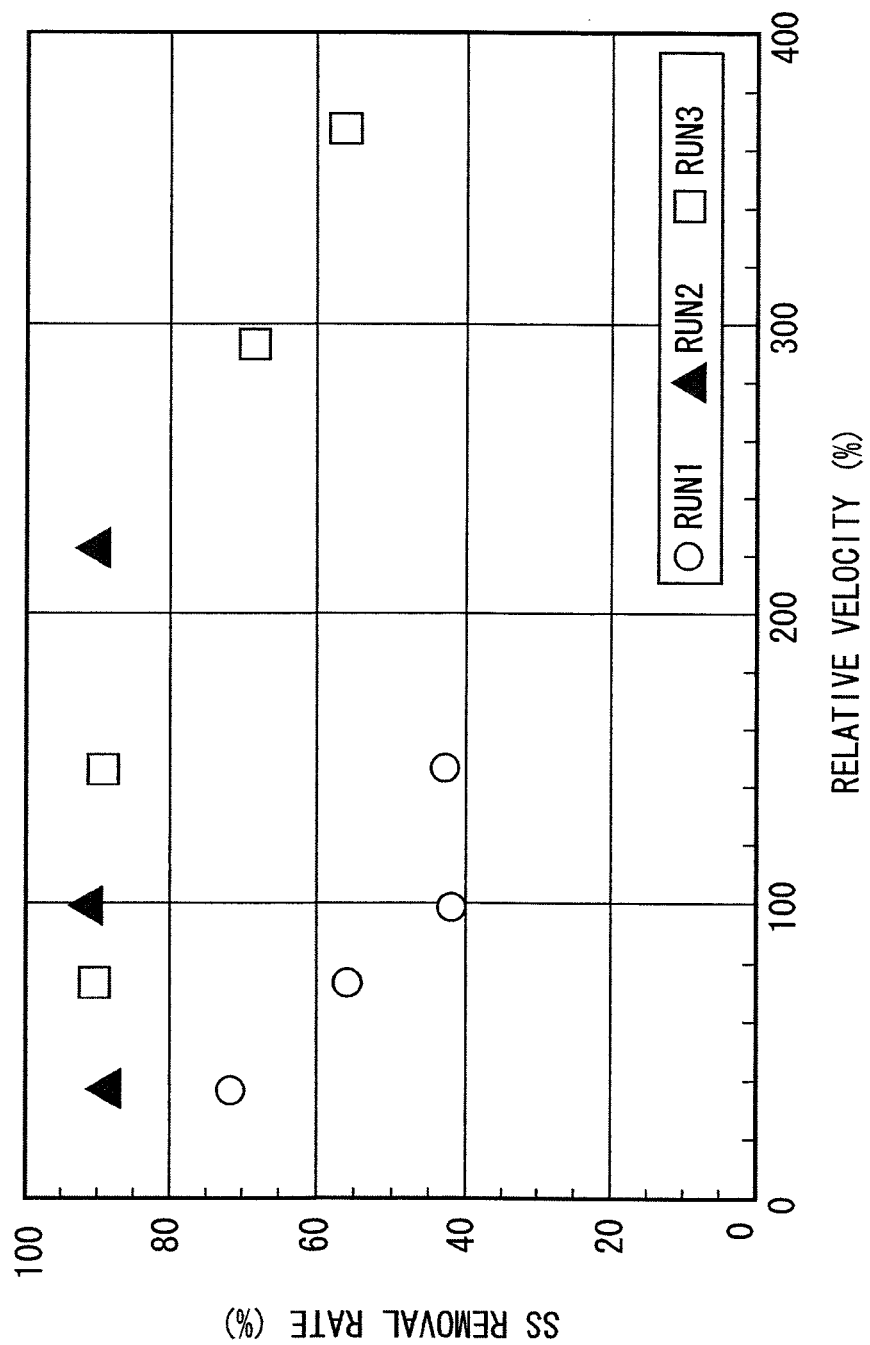
FIG. 7 is a graph showing experimental results of sample removal rates.

Results of a wastewater treatment experiment will be shown in FIG. 7.

Relative velocities represented with a horizontal axis of FIG. 7 are ratios of circumferential velocities (maximum circumferential velocities) of the disks 32 and 34 to an average flow velocity of wastewater in the separation tank 30. A relative velocity 100% shows that the average flow velocity of the wastewater and the maximum circumferential velocities of the disks 32 and 34 are the same as each other, relative velocities larger than 100% the maximum circumferential velocities of the disks 32 and 34 is larger than the average flow velocity of the wastewater, and relative velocities smaller than 100% the maximum circumferential velocities of the disks 32 and 34 is smaller than the average flow velocity of the wastewater.

A vertical axis of FIG. 7 shows removal rates of suspended solids in the wastewater. RUN1 of a sample 1 showed that the smaller the relative velocities, the better the removal rates of the suspended solids.

RUN2 of a sample 2 showed a best removal rate of the suspended solids when the relative velocity was 100%, and showed slightly lower removal rates of the suspended solids when the relative velocity was larger than 100% or when smaller than that.

RUN3 of a sample 3 showed a best removal rate of the suspended solids when the relative velocity was approximately 80%.

From the results described above, it is preferable that the relative velocity is not more than 100%. Such experimental results have been obtained due to the following reasons. Namely, a force that magnetic flocs having adhered to surfaces of the disks 32 and 34 experience under the water depends on the flow velocity of the wastewater and the rotational velocities of the disks 32 and 34. On that occasion, a force that the magnetic flocs having adhered to the disks 32 and 34 experience when pulled up from the water becomes the smallest when the relative velocity is not more than 100%. In other words, since the force that the flocs having adhered to the disks 32 and 34 experience when pulled up from the water becomes larger when the relative velocity becomes larger than 100%, a ratio that the flocs are detached from the surfaces of the disks 32 and 34 increases, thus resulting in a lower removal rate of the suspended solids.

In addition, since the magnetic flocs having adhered to the disks 32 and 34 are affected largely by the gravity when coming up from and leaving a surface of the wastewater by the rotations of the disks 32 and 34, they tend to leave the disks 32 and 34. Consequently, when the maximum circumferential velocities of the disks 32 and 34 are set to be not more than the flow velocity of the wastewater in the separation tank 30, to the magnetic flocs added is a force that pushes the magnetic flocs upwardly along with the disks 32 and 34 with flow momentum of the wastewater when the magnetic flocs tend to leave the water. As a result of this, since detachment of the magnetic flocs from the disks 32 and 34 can be suppressed, an efficiency of collecting the magnetic flocs is further improved.

Specifically, if a diameter of the two disks 32 and 34 shown in FIGS. 2 to 6 is set to be 900 millimeters, an interval between the disks 32 and 34 is 50 millimeters, and there is a discoid with a diameter of 300 millimeters between the disks that presses down the disks but that does not work as a water flow path, an average flow velocity of the wastewater in the separation tank 30 is 0.135 m/s when an amount of water to be treated is 7.3 m$^3$/h. Hence, it is preferable that the maximum circumferential velocity of the disks 32 and 34 is set to be 0.068 to 0.135 m/s (the relative velocity is not more than 50 to 100%).

Figure 8:
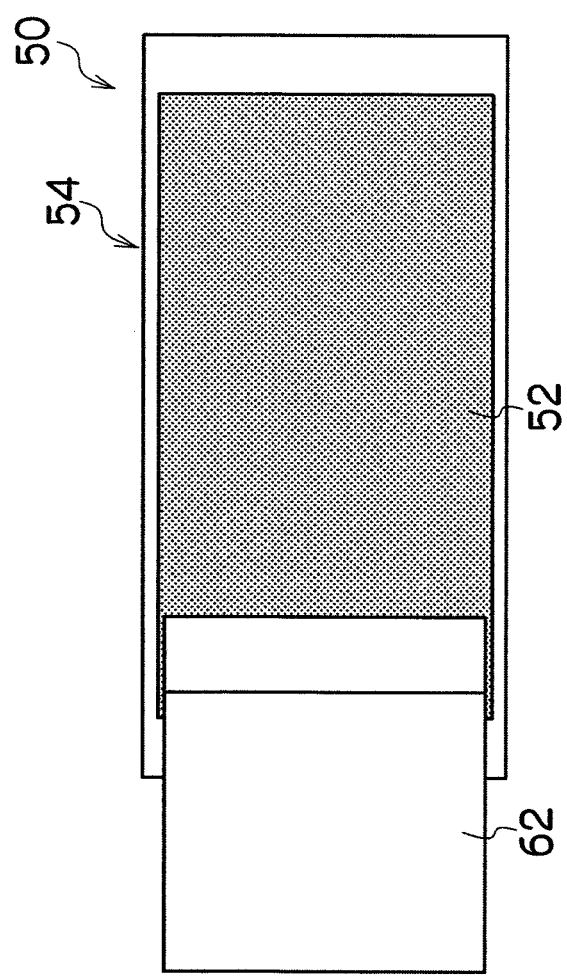
FIG. 8 is a plan view of a magnetic separation apparatus of a second embodiment.
Figure 9:
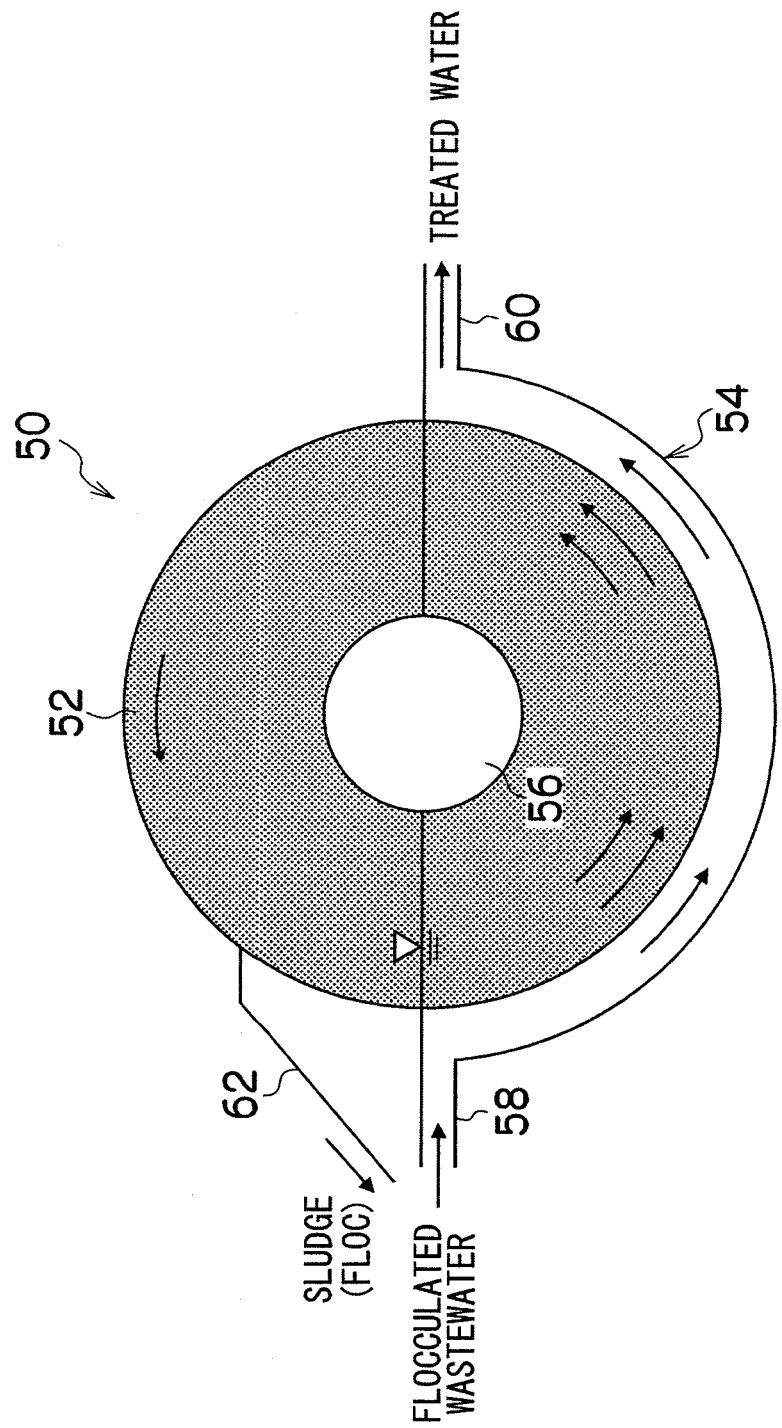
FIG. 9 is an elevational view of the magnetic separation apparatus shown in FIG. 8.
Figure 10:
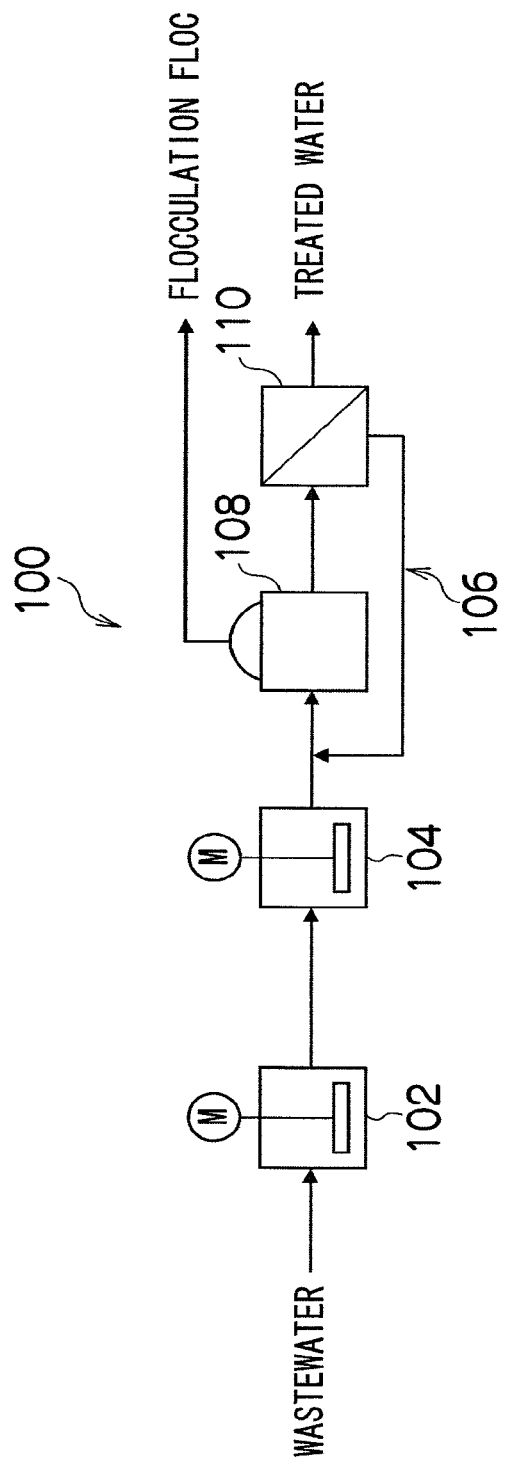
FIG. 10 is a block diagram showing a configuration of a conventional wastewater treatment apparatus.
Figure 11:
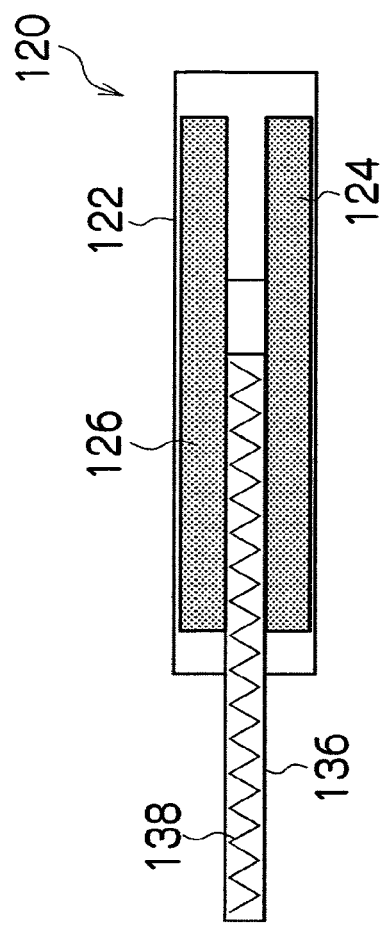
FIG. 11 is a plan view of a conventional magnetic separation apparatus.
Figure 12:
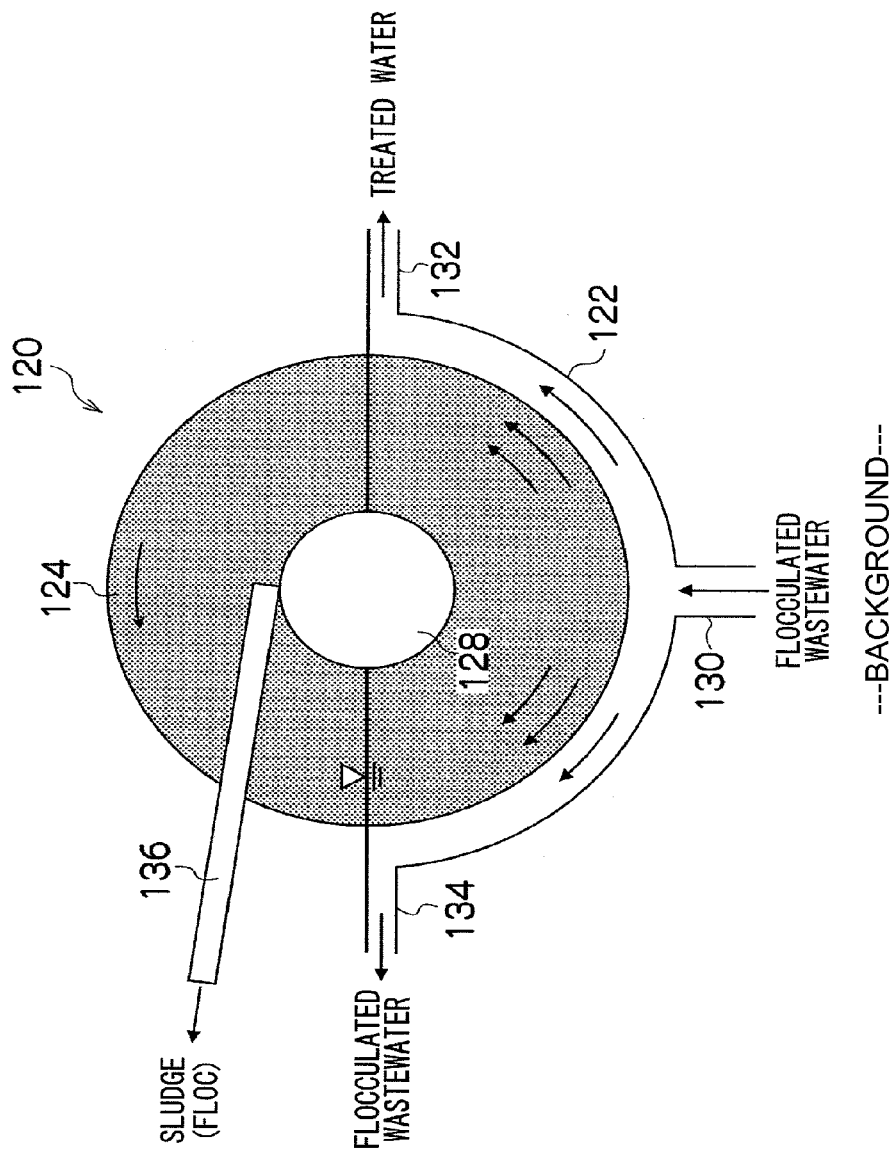
FIG. 12 is an elevational view of the magnetic separation apparatus shown in FIG. 11.

A magnetic separation apparatus 50 of a second embodiment will be shown in FIGS. 8 and 9. It is to be noted that FIG. 8 is a plan view of the magnetic separation apparatus 50, and that FIG. 9 is an elevational view thereof.

The magnetic separation apparatus 50 shown in these drawings has a drum 52 instead of the disks 32 and 34 shown in FIGS. 2 to 6.

Magnet pieces are densely attached to a surface of the drum 52. This drum 52 is arranged so that a lower half thereof may be under the water in a separation tank 54 whose cross section is semicircular. In addition, a shaft 56 is fixed to side surfaces of the drum 52, and this shaft 56 is connected to a motor (not shown). The drum 52 is rotationally driven in a counterclockwise direction at a predetermined velocity by driving this motor as shown in FIG. 9.

A supply portion 58 of the wastewater is provided at one end of both top ends of the separation tank 54, the end being located upstream in a rotational direction of the drum 52, and an outlet portion 60 is provided at the other end of the both top ends, the end being located downstream in the rotational direction of the drum 52. It is to be noted that if the rotational direction of the drum 52 and a flow direction of the wastewater in the separation tank 54 become the same as each other, installation positions of the supply portion 58 and the outlet portion 60 are not limited to the above-described ones.

Magnetic flocs that adhere to a surface of the drum 52 with magnetic force are scraped by a scraper 62 at positions above the water, and then collected to a lower portion along the scraper 62. For example, if a diameter of the drum is set to be 600 millimeters, a length thereof is 600 millimeters, a height of a water flow path is 25 millimeters, and an amount of water to be treated is 7.3 m$^3$/h, an average flow velocity of the wastewater in the separation tank is 0.135 m/s, so that it is preferable that a circumferential velocity of the drum is set to be 0.068 to 0.135 m/s (the relative velocity is approximately 50% to not more than 100%).

Although the scraper 42 and the sludge scraper 44 are respectively required between the disks in the disk-shaped magnetic separation apparatus 10 shown in FIGS. 2 to 6, according to the drum-shaped magnetic separation apparatus 50 shown in FIGS. 8 and 9, a structure of the apparatus can be simplified since sludge can be collected only with the scraper 62.

What is claimed is:

1. A magnetic separation apparatus, comprising:
    a separation tank to which wastewater containing flocculated magnetic flocs is supplied;
    a drum-shaped separator having an outer periphery, the outer periphery having a constant radius along an axis of rotation of the drum-shaped separator, wherein the drum-shaped separator adsorbs the magnetic flocs on the outer periphery with magnetic force while being rotated, and the drum-shaped separator is arranged in the separation tank; and
    a collection device that collects the magnetic flocs adsorbed by the drum-shaped separator,
    wherein a cross section of the separation tank is substantially semicircular, a supply portion of the wastewater is provided at one top end of both top ends of the separation tank, the one top end being located upstream in a rotational direction of the drum-shaped separator, and an outlet portion of treated water is provided at the other to end of the both top ends, the other top end being located downstream in the rotational direction of the drum-shaped separator,
    wherein the rotational direction of the outer periphery of the drum-shaped separator in the wastewater in the separation tank is set to be the same as a flow direction of the wastewater flowing in the separation tank as well as substantially a lower half of the drum-shaped separator being submerged in the wastewater in the separation tank, and
    wherein the collection device comprises a flat plate-shaped scraper to scrape the magnetic flocs on the outer periphery of the drum-shaped separator.

2. The magnetic separation apparatus according to claim 1, wherein a maximum circumferential velocity of the separator is set to be not more than a flow velocity of the wastewater in the separation tank.

3. The magnetic separation apparatus according to claim 1, wherein the collection device does not include a spiral-shaped sludge scraper.

4. A wastewater treatment apparatus, comprising:
    a raw water tank in which wastewater is stored;
    a rapid stirring tank for mixing wastewater supplied from the raw water tank, magnetic powder, and an inorganic flocculant;
    a slow stirring tank for generating magnetic flocs in wastewater by mixing the supplied wastewater mixed in the rapid stirring tank and a polymeric flocculant; and
    the magnetic separation apparatus according to claim 1 that separates from wastewater the magnetic flocs in the supplied wastewater mixed in the slow stirring tank.

5. A magnetic separation method that flows wastewater containing flocculated magnetic flocs into a separation tank, adsorbs the magnetic flocs with magnetic force of a separator while rotating the drum-shaped separator, the drum-shaped separator being arranged in the separation tank, and that collects the magnetic flocs adsorbed by the drum-shaped separator with a collection device,
    wherein the drum-shaped separator has an outer periphery, and the outer periphery has a constant radius along an axis of rotation of the drum-shaped separator,
    wherein the drum-shaped separator absorbs the magnetic flocs on the outer periphery with the magnetic force while being rotated,
    wherein a cross section of the separation tank is formed to be substantially semicircular, the wastewater is supplied to the separator from one top end of both top ends of the separation tank, the one top end being located upstream in a rotational direction of the drum-shaped separator, and an outlet portion of treated water is provided at the other top end of the both top ends, the other top end being located downstream in the rotational direction of the drum-shaped separator,
    wherein the rotational direction of the outer periphery of the drum-shaped separator in the wastewater in the separation tank is set to be the same as a flow direction of the wastewater flowing in the separation tank as well as substantially a lower half of the drum-shaped separator being submerged in the wastewater in the separation tank, and
    wherein the collection device comprises a flat plate-shaped scraper to scrape the magnetic flocs on the outer periphery of the drum-shaped separator.

6. The magnetic separation method according to claim 5, wherein a maximum circumferential velocity of the separator is set to be not more than a flow velocity of the wastewater in the separation tank.

7. The magnetic separation method according to claim 5, wherein the collection device does not include a spiral-shaped sludge scraper.

8. A wastewater treatment method, comprising the steps of:
    supplying wastewater stored in a raw water tank to a rapid stirring tank;
    mixing the wastewater, magnetic powder, and an inorganic flocculant in the rapid stirring tank to then supply the mixed wastewater to a slow stirring tank;
    generating magnetic flocs in the wastewater by stirring the wastewater supplied into the slow stirring tank and a polymeric flocculant to then supply the wastewater to a magnetic separation apparatus; and
    separating the magnetic flocs from the wastewater supplied to the magnetic separation apparatus with the magnetic separation method according to claim 5.

* * * * *